(12) United States Patent
Smeeton et al.

(10) Patent No.: US 12,498,507 B2
(45) Date of Patent: Dec. 16, 2025

(54) LIGHT CONTROL FILM

(71) Applicant: Envisics Ltd, Milton Keynes (GB)

(72) Inventors: Timothy Smeeton, Milton Keynes (GB); Yiren Xia, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 236 days.

(21) Appl. No.: 18/240,918

(22) Filed: Aug. 31, 2023

(65) Prior Publication Data
US 2024/0077651 A1 Mar. 7, 2024

(30) Foreign Application Priority Data
Sep. 5, 2022 (GB) .................................... 2212903

(51) Int. Cl.
G02B 1/111 (2015.01)
G02B 5/00 (2006.01)
G02B 5/04 (2006.01)
G02B 27/01 (2006.01)

(52) U.S. Cl.
CPC ............. G02B 1/111 (2013.01); G02B 5/003 (2013.01); G02B 5/045 (2013.01); G02B 27/0103 (2013.01)

(58) Field of Classification Search
None
See application file for complete search history.

(56) References Cited

U.S. PATENT DOCUMENTS

| 6,542,298 B1 | 4/2003 | Kazuo |
| 12,181,668 B2 | 12/2024 | Smeeton |
| 2003/0137758 A1 | 7/2003 | Ikeda |
| 2004/0191548 A1 | 9/2004 | Takemoto |

(Continued)

FOREIGN PATENT DOCUMENTS

| DE | 2914682 A1 | 3/1981 |
| GB | 2047912 A | 12/1980 |

(Continued)

OTHER PUBLICATIONS

Search Report in United Kingdom, Patent Application No. GB2212903.5, dated Mar. 1, 2023.
Copending U.S. Appl. No. 18/240,884, filed Aug. 31, 2023.

*Primary Examiner* — Kristy A Haupt
(74) *Attorney, Agent, or Firm* — McDonnell Boehnen Hulbert & Berghoff LLP

(57) ABSTRACT

A method of manufacturing a light control film includes providing a plurality of alternating layers of transparent material and light absorbing material. Each layer of light absorbing material is interspersed between respective layers of transparent material. The plurality of alternating layers are stacked in a stacking direction perpendicular to the plane of a surface of at least one of the plurality of alternating layers. The method includes cutting the plurality of alternating layers in a first and second cutting plane resulting in an intermediate film including a first cut surface parallel to the first cutting plane and a second cut surface parallel to the second cutting plane. Each of the first and second cutting planes is orientated at an angle less than or equal to 90° to the stacking direction. The method includes hot embossing the repeating prismatic structure on the first cut surface of the intermediate film resulting in a serrated/corrugated first surface.

20 Claims, 14 Drawing Sheets

(56) References Cited

U.S. PATENT DOCUMENTS

| | | |
|---|---|---|
| 2006/0227569 A1 | 10/2006 | Uehara |
| 2007/0268586 A1 | 11/2007 | Mimura |
| 2019/0346615 A1* | 11/2019 | Johnson ............... G02B 6/0051 |
| 2021/0294003 A1 | 9/2021 | Roehrig |
| 2022/0221624 A1 | 7/2022 | Kenney |
| 2023/0314802 A1 | 10/2023 | Smeeton |
| 2023/0324683 A1 | 10/2023 | Smeeton |
| 2024/0019694 A1 | 1/2024 | Döbler |

FOREIGN PATENT DOCUMENTS

| | | |
|---|---|---|
| GB | 2607672 A | 12/2022 |
| JP | 2006100125 A | 4/2006 |
| JP | 2006119365 A | 5/2006 |
| JP | 2014063106 A | 4/2014 |
| JP | 2017167326 A | 9/2017 |
| KR | 20050034247 A | 4/2005 |
| KR | 20140071111 A | 6/2014 |
| WO | 2015/186675 A1 | 12/2015 |

\* cited by examiner

LIGHT CONTROL FILM

CROSS-REFERENCE TO RELATED APPLICATIONS

This application claims the benefit of priority of United Kingdom Patent Application No. 2212903.5 filed Sep. 5, 2022, which is hereby incorporated herein by reference in its entirety.

FIELD

The present disclosure relates to a method of manufacturing a light control film. Some embodiments relate to using the light control film in a holographic projector, picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In one aspect, a method of manufacturing a light control film is provided. The method comprises providing a plurality of alternating layers of transparent material and light absorbing material. Each layer of light absorbing material is interspersed between respective layers of transparent material. The plurality of alternating layers of transparent material and light absorbing material is stacked in a stacking direction. The stacking direction is perpendicular to the plane of a surface of at least one of the plurality of alternating layers. The method further comprises cutting, with a straight edge, through the plurality of alternating layers of transparent material and light absorbing material in a first cutting plane and a second cutting plane thereby resulting in an intermediate film comprising a first cut surface parallel to the first cutting plane and a second cut surface parallel to the second cutting plane. Each of the first and second cutting planes is orientated at an angle less than or equal to 90° to the stacking direction. The method further comprises hot embossing, using a tool having a repeating prismatic structure, the repeating prismatic structure on the first cut surface of the intermediate film thereby resulting in a serrated/corrugated first surface. Advantageously, the serrated/corrugated surfaces of the light control film prevent direct reflection of sunlight to the eye-box. Additionally, the light control film with serrated surfaces can eliminate sun glare on a clear optical surface. Furthermore, the hot-embossing process tends to allow for a more reliable and cost-effective way of manufacturing the light control film.

The method may further comprise hot embossing, using the tool, the repeating prismatic structure on the second cut surface of the intermediate film thereby resulting in a serrated/corrugated second surface.

The method may further comprise aligning ridges of the prismatic structure with edges of the layers of light absorbing material before hot embossing the repeating prismatic structure. The first and second cutting planes may be parallel with each other.

The serrated first surface may comprise a first front facet at an angle greater than 30°, such as greater than 35° to the first cut surface. The serrated second surface may comprise a second front facet at an angle greater than 30°, such as greater than 35° to the second cut surface. Advantageously, the inventors have found, this means that reflected sunlight propagating through the serrated first and/or second surface cannot reach the eye-box. Simultaneously, any internal reflection is absorbed by the strips of light absorbing material due to the orientation of the strips of light absorbing material. In some embodiments, the louvre angle (measured from the surface normal) required for effective sunlight/reflection suppression is less than 60 degrees such as less than 55 degrees.

The step of providing the plurality of alternating layers may comprise: providing a first layer of transparent material, providing a first layer of light absorbing material onto the first layer of transparent material, providing a second layer of transparent material onto the first layer of light absorbing material such that the first layer of light absorbing material is between the first and second layers of transparent material, and providing a second layer of light absorbing material onto the second layer of transparent material such that the second layer of transparent material is between the first and second layers of light absorbing material.

The step of providing the first and/or second layers of light absorbing material may comprise airbrushing or solution coating.

Each of the layers of transparent material comprises opposing rough surfaces configured to scatter light. Each of the rough surfaces may be a boundary between a respective layer of transparent material and a respective layer of light absorbing material. Advantageously, the rough surfaces of the transparent layers, e.g. PMMA sheets, tend to scatter light thereby further preventing the reflected sunlight from reaching the eye-box. Furthermore, the layer light absorbing material deposited on the rough surfaces also results in a rough surface on the layer of light absorbing material. The rough surface on the layer of light absorbing material increasing light scattering means that the light absorbing layer can more effectively absorb the reflected sunlight.

The layers of light absorbing material are black adhesive or black paint, or black silicone rubber or any combination thereof. The layers of transparent material are made from PMMA or transparent silicone rubber or any combination thereof. Each layer of light absorbing material has a thickness of 10 µm-100 µm. Each of the layers of transparent material has a thickness of 0.1 mm to 10 mm. The method of the above aspects may further comprise applying an anti-reflective coating on the serrated first and/or second surface. Each layer of transparent material is wedge shaped. The layers of the plurality of alternating layers are parallel to each other.

In another aspect, a method of manufacturing a head-up display for a vehicle is provided. The method comprises: providing an optical component having a reflective surface arranged, during head-up display operation, in a configuration that is conducive to sunlight glare, and disposing the light control film manufactured using the method of any preceding aspects onto the reflective surface of the optical component.

In yet another aspect, a head-up display for a vehicle is provided. The head-up display comprises: an optical component having a reflective surface arranged, during head-up display operation, in a configuration that is conducive or susceptible to sunlight glare; and a light control layer manufactured using any preceding aspect disposed onto the reflective surface of the optical component. The light control layer may be a reflection suppression component.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
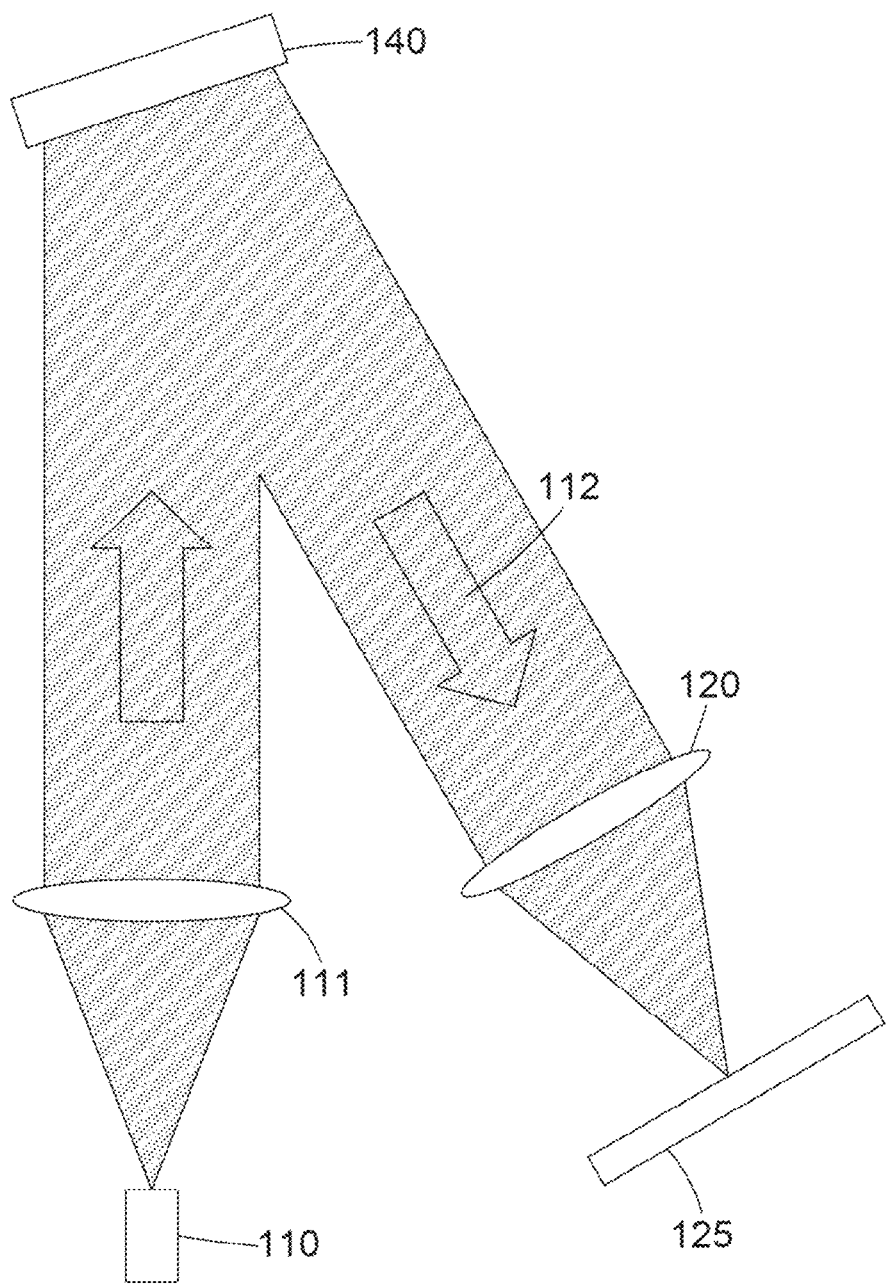
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 (published as GB2603517A) and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 (published as GB2614286) and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling

The hologram formed in accordance with some embodiments, angularly-divides the image content to provide a plurality of hologram channels which may have a cross-sectional shape defined by an aperture of the optical system. The hologram is calculated to provide this channeling of the diffracted light field. In some embodiments, this is achieved during hologram calculation by considering an aperture (virtual or real) of the optical system, as described above.

Figure 2:
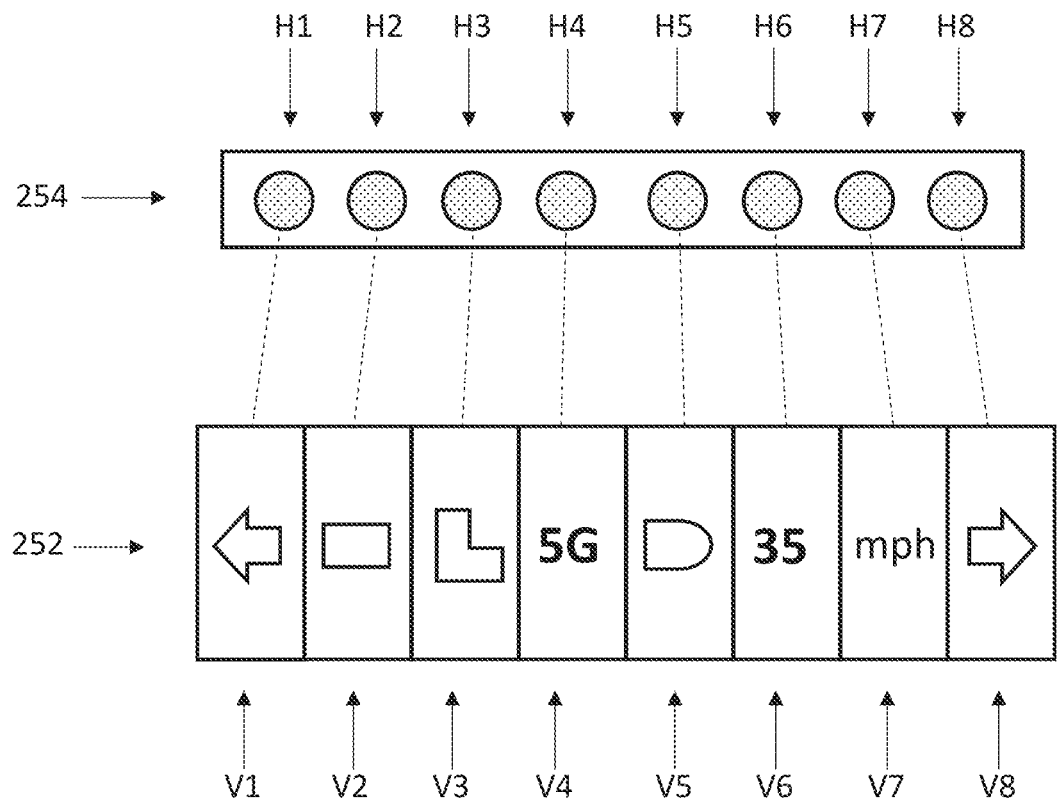
FIG. 2 shows an image for projection comprising eight image areas/components, V1 to V8, and cross-sections of the corresponding hologram channels, H1-H8.
Figure 3:
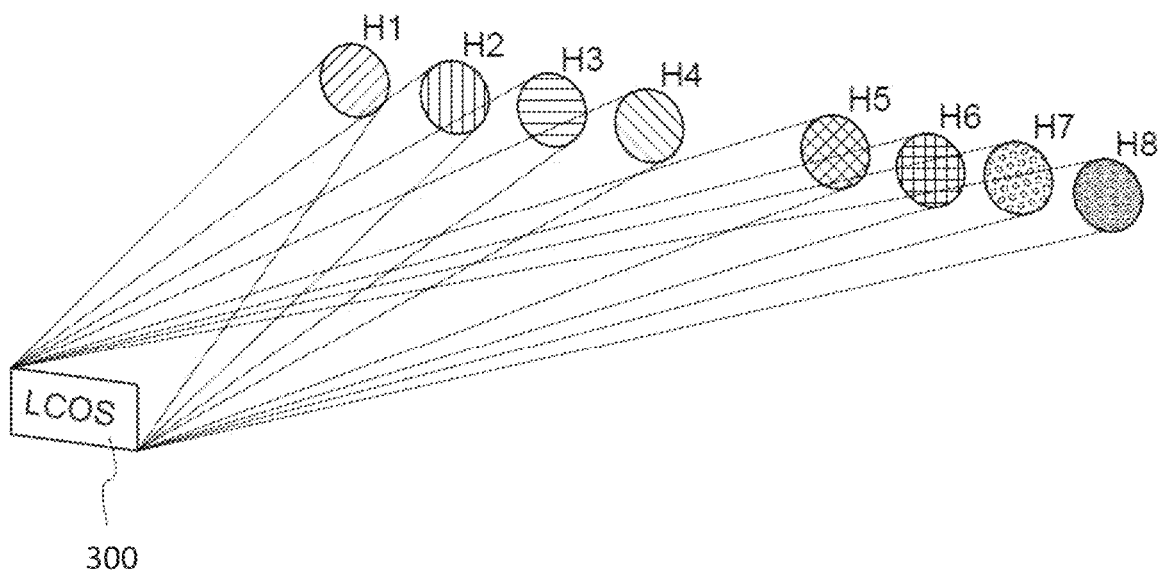
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram in this example, displayed on an LCOS 300, directs light into a plurality of discrete areas. The discrete areas are discs H1 to H8 in the example shown but other shapes are envisaged. The size and shape of the optimum disc may, after propagation through the waveguide, be related to the size and shape of an aperture of the optical system such as the entrance pupil of the viewing system.

Figure 4:
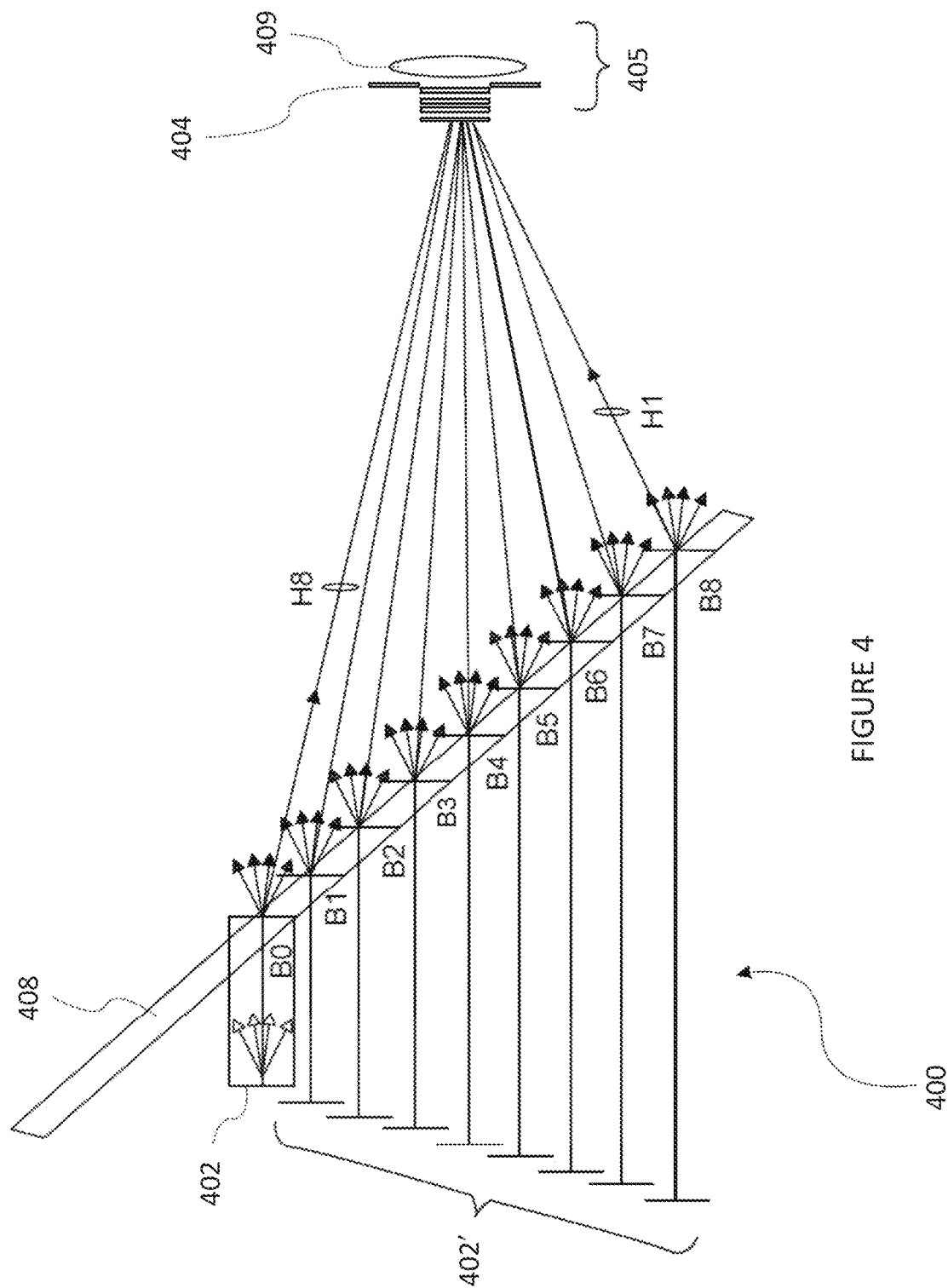
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 408 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
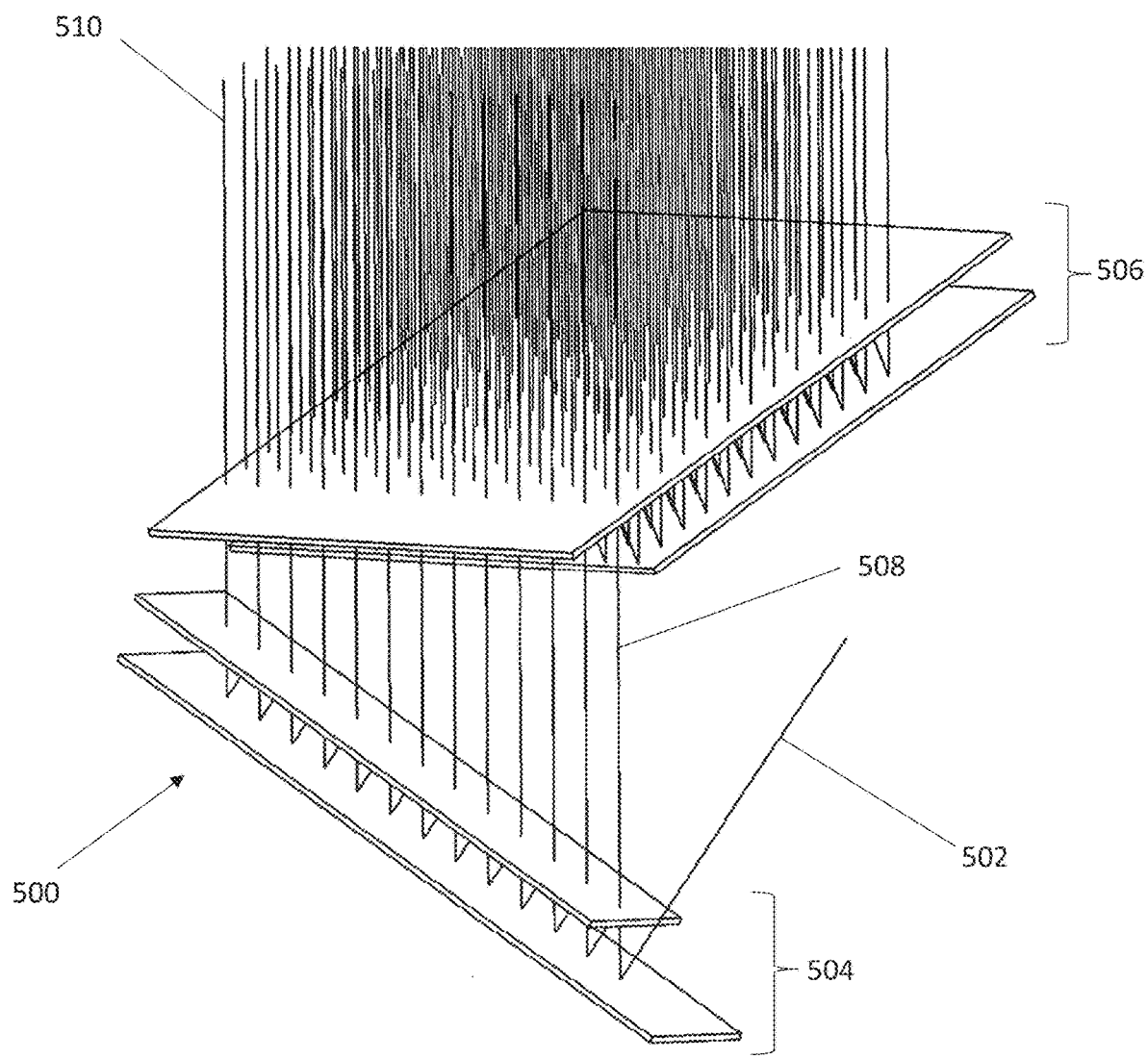
FIG. 5A shows a perspective view (not to scale) of a system comprising two replicators arranged for expanding a light beam in two dimensions.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
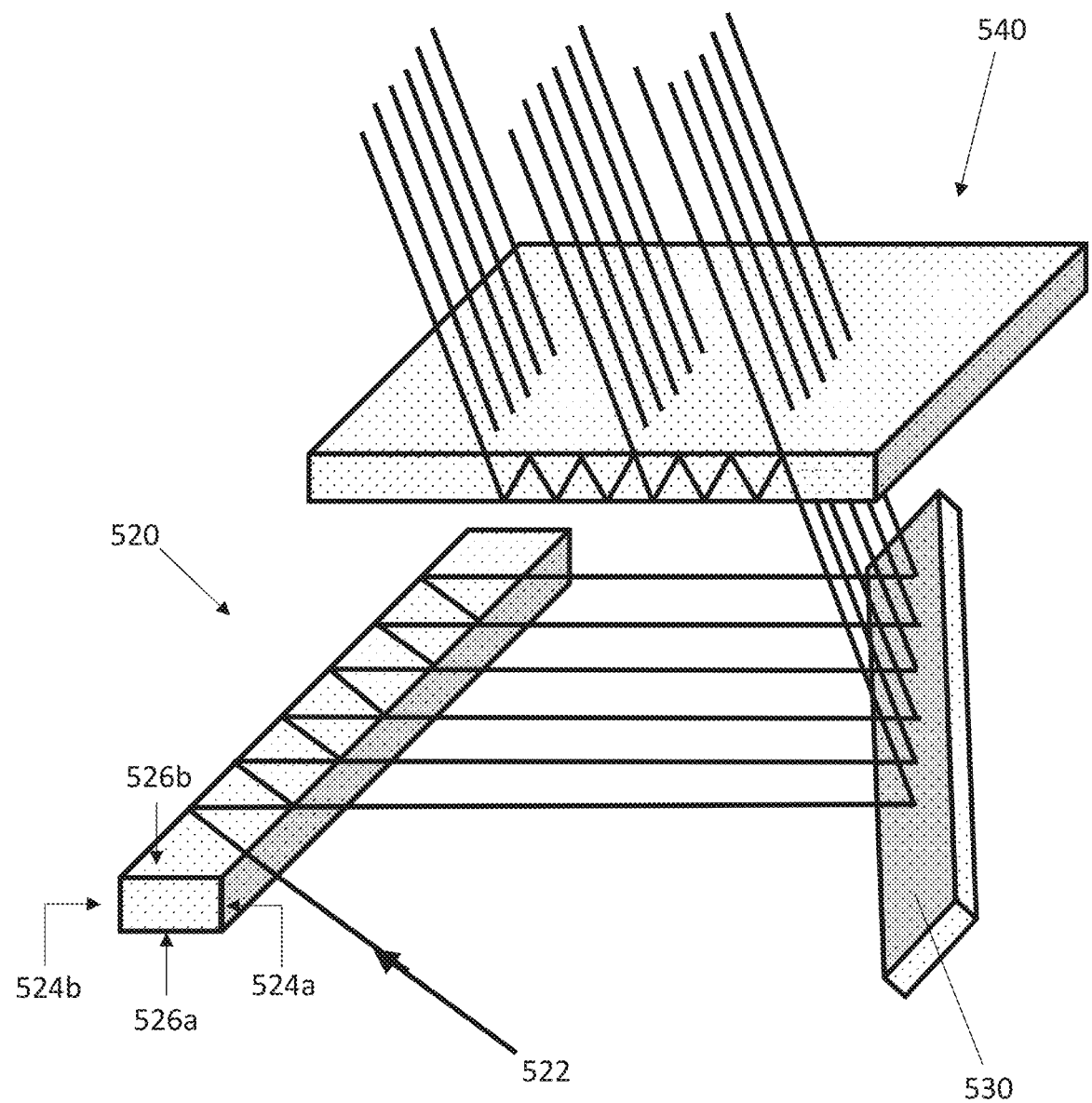
FIG. 5B shows a perspective view (not to scale) of another system comprising two replicators arranged for replicating a light beam in two dimensions.

FIG. 5B shows a perspective view of a system 500 comprising two replicators, 520, 540 arranged for replicating a light beam 522 in two dimensions, in which the first replicator is a solid elongated waveguide 520 (having a pair of elongate parallel reflective surfaces 524a, 524b as well as surfaces 526a and 526b) and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as they dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channeling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the deliver of hologram light channels, and their replicas, to the eye-box. Each aperture or window may comprise a plurality of liquid crystal cells or pixels.

Figure 6A:
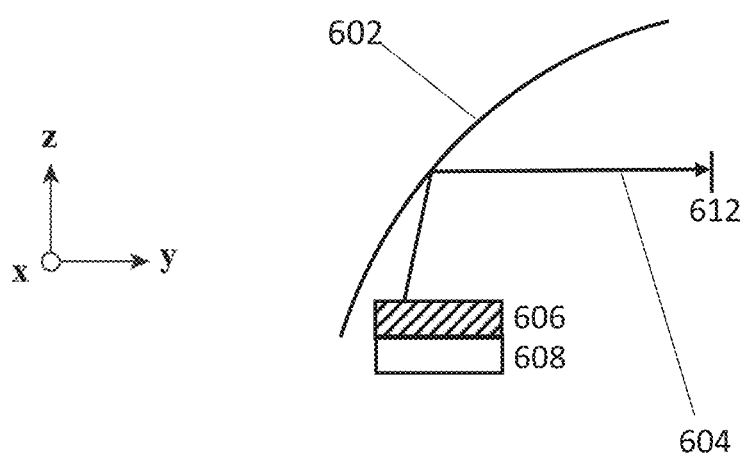
FIG. 6A is schematic side view (not to scale) showing an optical path of image light from a head-up display in a vehicle to an eye-box with a replicator having a light control film.
Figure 6B:
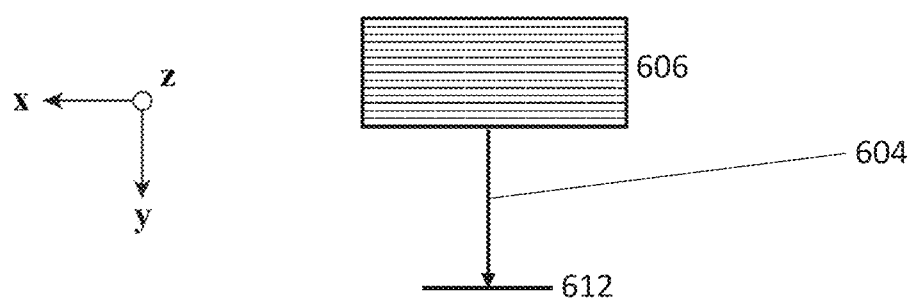
FIG. 6B is a schematic top view showing the optical path of image light from the light control film to the eye-box.

FIGS. 6A and 6B provide views from different angles of the use of such a light control film in a head-up display operating in a vehicle. In the illustrated arrangement, the optical component of the head-up display 608 at the interface with air (e.g. second replicator 506 in FIG. 5) is orientated substantially horizontally, illustrated as the x-y plane. For example, the optical component may be positioned in an opening in an upwardly facing surface of the vehicle dashboard. The transmission surface of the optical component is covered by a light control film 606 comprising a one-dimensional array of louvres. The louvres may be in a substantially vertical plane, illustrated as the x-z plane. In the illustrated arrangement, the louvres are tilted with respect to the vertical plane (i.e. from an orthogonal orientation relative to the plane of the light control layer). In particular, the louvres have sloped sidewalls. The louvres may be light absorbing or light attenuating.

As shown in FIG. 6A, image light from the head-up display 608 passes between the louvres of the light control film 606 and is transmitted to an optical combiner 602 (e.g. windshield). The optical combiner 602 redirects the image light 604 substantially horizontally, illustrated as the y direction, towards the eye-box 612, where a viewer (e.g. vehicle driver) can perceive a virtual image (combined with the external scene observed through the windshield).

Figure 7:
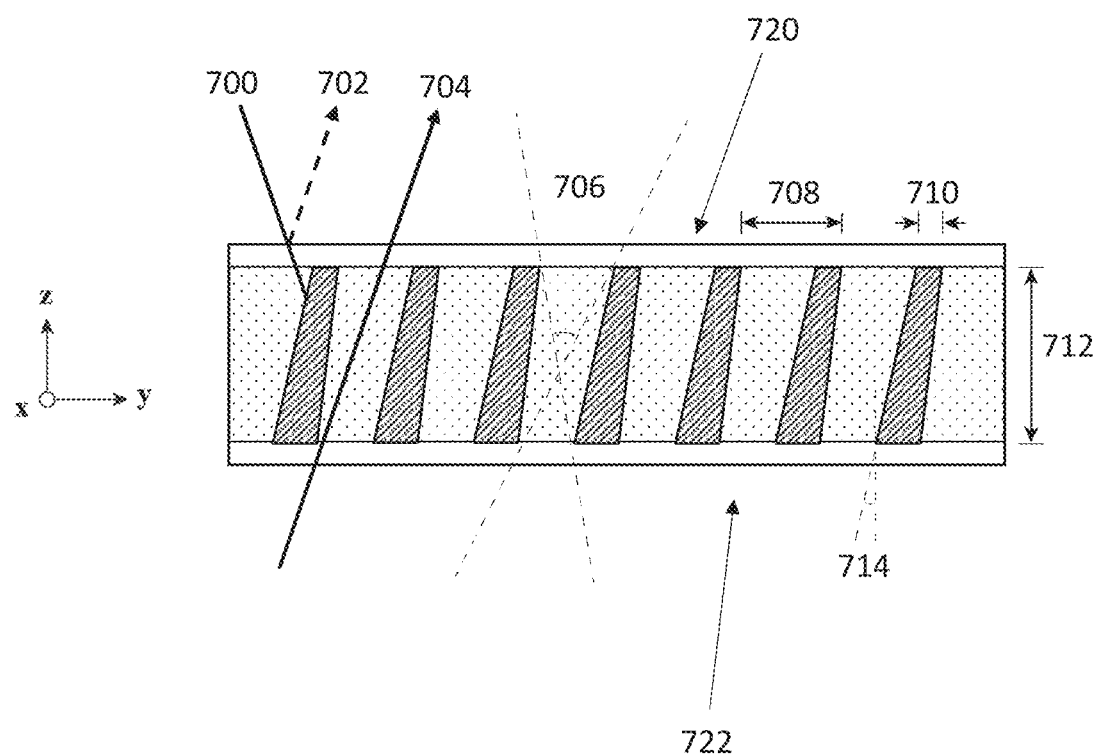
FIG. 7 is a cross-sectional view (not to scale) of an example light control film comprising an array of louvres.

FIG. 7 shows an example light control film comprising an array of louvres in more detail.

The light control film 712 comprises first (bottom/internal) and second (top/external) surfaces that define the thickness of the light control film 712. In the illustrated arrangement, since the surfaces of the light control film 712 may be uneven, an optically transparent coating layer (which also may be referred to as a "cladding layer") is provided on each of the first and second surfaces for planarization. Thus, light control film 712 is sandwiched between a pair of optically transparent coating or cladding layers or films having respective outer surfaces 720, 722. The skilled person will appreciate that a coating/planarization layer is not required on the first (bottom/internal) surface in arrangements in which the light control film 712 is formed directly on a planar transmission surface of the optical component (e.g. second replicator 506). The light control film 712 comprises a core of optically transparent material with a plurality of light absorbing louvres disposed therein. The louvres are periodically arranged in a one-dimensional array, illustrated as extending in the y direction, with a uniform spacing or pitch 708 between adjacent louvres. The spacing between the louvres is sufficiently small to optimize light absorption without causing diffraction or ghost images. In examples, the spacing between the louvres may be around 10-1000 μm such as 50-250 μm. The louvres extend through the full thickness of the light control film 712 and are configured with an orientation, pitch and geometry arranged to limit the range of transmission angles 706 from the second (top/external) surface, as shown by dashed lines.

In the illustrated arrangement, each louvre has a trapezoidal cross section (i.e. with non-parallel, sloped sidewalls) that tapers (narrows) to a thickness 710 at the second (top/external) surface of light control film 712. Accordingly, the sidewalls of each louvre are tilted with respect to a plane perpendicular to the first and second surfaces of the light control film 712 (shown as the vertical or x-z plane), as illustrated by tilt angle 714. In the illustrated arrangement, the geometry of the louvres is the same, and the opposed sidewalls of each louvre are tilted at different angles. As the skilled person will appreciate, in other arrangements, the louvres may have a rectangular cross section (i.e. with parallel, non-sloped sidewalls) and/or may be orientated in a plane perpendicular to the first and second surfaces of the light control film 700 as well as at any desired tilt angle with respect thereto.

Accordingly, image light 704 incident from the transmission surface of the optical component of the head-up display passes through the light control film 712 and associated coating/planarization layers between the louvres. In embodiments, the louvres are geometrically configured to allow the passage of image light 704, through the optically transparent core between the louvres, at the range of angles required for the image to be visible at all positions within the eye-box. Thus, in examples that implement the special hologram, as described herein with reference to FIGS. 2 to 4, the range of transmission angles may allow all the angular channels of the hologram to reach the eye-box. For example, the image light 704 may be transmitted (e.g. as ray bundles from multiple transmission points of the optical component as described herein) at one or more defined optical path angles that pass between the louvres to the eye-box, for example as shown by the solid arrow in FIG. 7. Due to the small spacing between the louvres, each replica formed at one of the multiple transmission points along the transmission surface of the optical component may be incident upon a plurality of louvres of the light control film 712.

However, as noted above, sunlight may be incident on the second (top/external) surface of the light control film 712, as shown by arrow 700. Accordingly, the second (top/external) surface of the light control film 712 is described herein as the "light receiving surface" of the light control film 712. It will be appreciated that sunlight may be incident on the surface of the light control film 712 at any angle, and the ray angle shown by arrow 700 is merely an example. Sunlight that is coupled into the light control film 712 at the planar top surface 720 (i.e. external interface with air) may enter at an angle such that the light is directly absorbed by one of the louvres in a "first pass", as shown by arrow 700. Alternatively, sunlight that is coupled into the light control film 712 at the planar top surface 720 may enter at an angle such that the light passes between the louvres into the optical component (not shown). In this case, the sunlight reflected out of the optical component is absorbed by one of the louvres in a "second pass" and so is not transmitted by the light control film 712. However, a proportion of the sunlight may be reflected at the planar top surface 720 (i.e. external interface with air). In this case, there is a risk that the sunlight is reflected at an angle that follows an optical path to the eye-box. FIG. 7 shows an example ray of reflected sunlight 702 in dashed line at an angle parallel to a ray of the image light 704 from the head-up display that is transmitted between louvres and out of the light control film 712. It will be appreciated that the illustrated ray of image light 704 is just one example of a plurality of rays of a diverging ray bundle of a replica transmitted from a transmission point of the optical component at an angle that passes between louvres. In addition, it will be appreciated that light rays of the same replica may pass between other pairs of adjacent louvres at the same or different ray angles. Thus, the reflected ray of sunlight 702 will follow the same optical path as the illustrated ray of image light 704 to the eye-box and cause glare to the viewer. This problem is addressed by the present disclosure, as illustrated by the embodiments described below. In the description of the embodiments, similar reference numerals are used to denote similar features to the example of FIG. 7.

Figure 8:
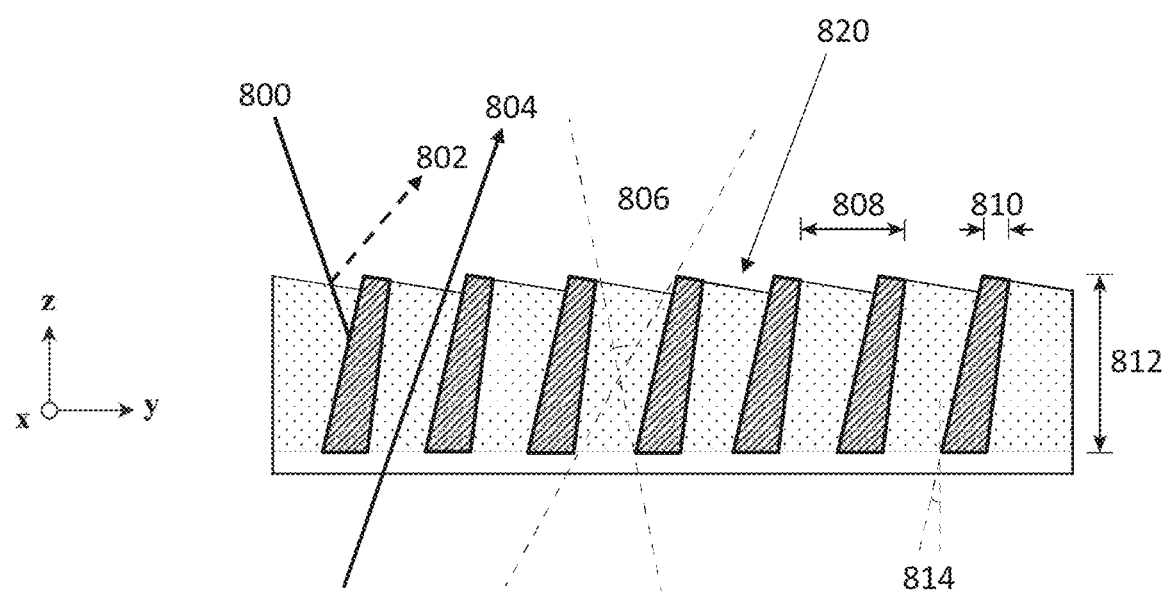
FIG. 8 is a cross-sectional view (not to scale) of a light control film comprising an array of louvres.

FIG. 8 shows a light control film 812 in accordance with an embodiment of the present disclosure. Items 808, 810 and 814 are respectively analogous to items 708, 710 and 714 of FIG. 7. The light control film 812 is generally the same as the example of FIG. 7 described above, except that the coating layer on the second (top/external) surface of the light control film 812 is omitted. Thus, the second (top/external) surface of the light control film 812 forms the sunlight-receiving surface 820. Accordingly, as in the example of FIG. 7, the light control film 812 comprises a core of optically transparent material with a one-dimensional array of uniformly spaced louvres disposed therein. The louvres extend through the full thickness of the light control film 812 and are configured with a trapezoid configuration (i.e. with tilted or sloped sidewalls). As described above, the light control film 812 may be formed on the planar reflective surface of an optical component of the head-up display, such as the second replicator 506 of FIG. 5.

In accordance with the present disclosure, the light receiving surface 820 of the light control film 812 is serrated. In particular, the light receiving surface 820 is serrated in coordination with the array of louvres. For example, the arrangement of the serrations of the sunlight-receiving surface 820 are coordinated, synchronized or in alignment with the arrangement of the underlying array of louvres. Thus, the serrated configuration of the sunlight-receiving surface 820 is one-dimensional and extends in the first dimension. In the embodiment of FIG. 8, the serrated configuration comprises a one-dimensional array of uniformly spaced serrations (also called "projections" or "teeth") separated by surfaces that are angled with respect to the plane of the light control film 812/optical component (i.e. angled relative to the horizontal or x-y plane). Thus, in the embodiment of FIG. 8, the cross section of the sunlight-receiving surface 820 has a generally saw-tooth configuration. Furthermore, in the embodiment of FIG. 8, the uniformly spaced serrations are aligned with the louvres. Thus, it may be said that the periodicity of the serration of the sunlight-receiving surface 820 is substantially equal to the periodicity of the array of louvres.

As described above with reference to FIG. 7, light transmitted by the light control film 812 is limited to the range of angles 806 defined by the orientation, pitch and geometry (e.g., the side-wall angle) of the louvres. Thus, image light 804 from the optical component of the head-up display (not shown) is transmitted only at ray angles that fall within the limited range of angles 806, in order to pass through the light control film 712 between the louvres and follow an optical path to the eye-box. Furthermore, as described above with reference to FIG. 7, sunlight 800 that is coupled into the light control film 812 is either absorbed by one of the louvres and/or prevented from being transmitted to the eye-box due to the limited range of transmission angles 806.

In addition, in accordance with the present disclosure, sunlight 800 that is reflected by top surface 820 (i.e. external interface with air) is reflected in a direction away from the eye-box (e.g. in an automotive application, as described herein, in a direction away from a windshield that reflects image light to the eye-box) due to the serrated configuration, as shown in dashed line. In particular, due to the angled second (top/external) surface 820 of the light control film 812 over the optically transparent core regions between the louvres, the surface normal is similarly angled with respect to the normal to the plane of the light control film 812/optical component (i.e. the horizontal or x-y plane). Accordingly, due to the law of reflection, the angle of the sunlight 800 is changed (e.g. increased) in comparison to the angle of reflection with the planar surface 720 of the light control film 712 of FIG. 7. In examples, the angled surfaces are angled or inclined relative to (the normal to) the plane of the light control film 812/optical component be an angle in the range of 15 to 75°, such as to 60°, in either direction. Significantly, the slope or inclination of the angled surfaces of the light-receiving surface 820 is such that the angle of rays of reflected sunlight 802 is not within the strict range of angles 806 allowed/required for the image light 804 from the head-up display and so the rays of sunlight do not follow an optical path to the eye-box and cause glare.

A Method of Manufacturing a Light Control Film

In some holographic HUDs, glass waveguides are used to achieve 2D pupil expansion to meet the desired eye-box size and field of view. The coated waveguides together with a optical turning component form a flat and highly reflective surface on the dashboard of the car, any of which may be a source of sunlight glare (i.e. sunlight reflected into the eyes of a viewer). The reflected sunlight, at certain angles, would follow the optical path of HUD emission into the eye-box. This means that the driver may be blinded and/or distracted. A specialty light control film, also called louver film, is conventionally used to reduce unwanted reflections from vehicle windows for light emitted from displays (e.g. LCD). The light control film, typically made of plastic materials, has a plurality of clear regions separated by light absorbing louvers, which restricts light transmission to a fixed range of angles defined by dimension and orientation of louvers. However, these conventional light control films cannot eliminate reflection from an external light source (e.g. the sun).

Figure 9A:
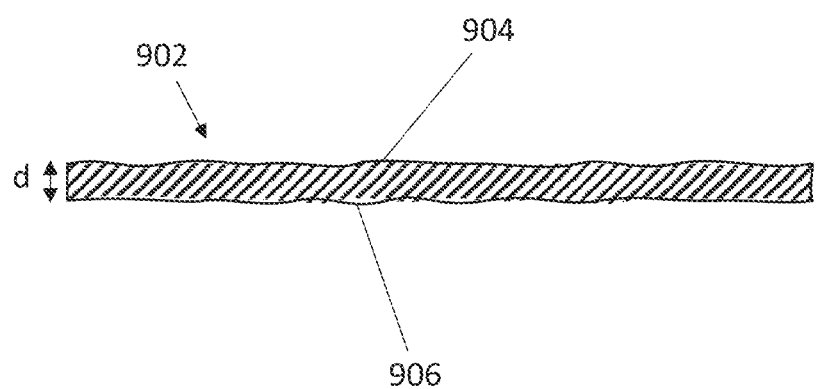
FIG. 9A is a cross-sectional view (not to scale) of a layer of transparent material.

A method of manufacturing a light control film is described below with reference to FIGS. 9A to 9E. The method comprises providing a layer of transparent material 902. A cross-sectional view (not to scale) of a layer of transparent material 902 is shown in FIG. 9A. The layer of transparent material 902 has a first surface 904 and a second surface 906 opposite to the first surface 904. The first and second surfaces 904, 906 is rough/uneven. Any light propagating through the first or second surface 904, 906 will be scattered. In this embodiment, the thickness d of the layer of transparent material 902 is 1 mm. In this embodiment, the layer of transparent material 902 is a layer of PMMA.

Figure 9B:
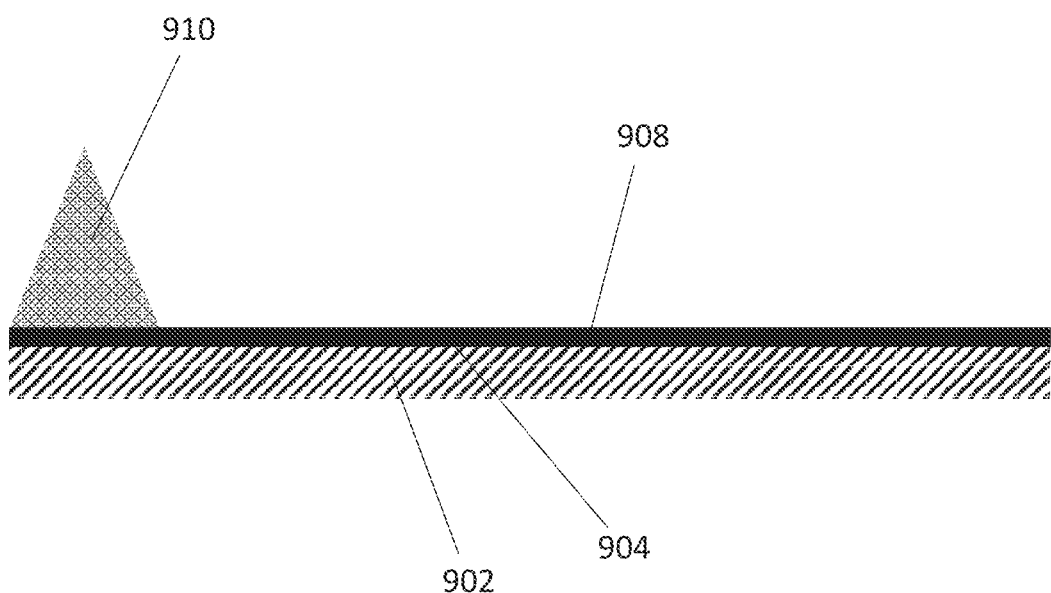
FIG. 9B is a cross-sectional view (not to scale) depicting depositing a layer of light absorbing material on the layer of transparent material.

The method further comprises depositing a layer of light absorbing material 908 on the layer of transparent material 902. FIG. 9B is a cross-sectional view (not to scale) depicting airbrushing a layer of light absorbing material 908 onto the layer of transparent material 902. In this embodiment, the layer of light absorbing layer 908 is deposited on the first surface 904. The layer of light absorbing layer 908 is a black adhesive or a black paint. The layer of light absorbing layer 908 can be deposited using airbrushing or solution coating techniques. The thickness of the layer of light absorbing material 908 is 10 μm-100 μm.

The method further comprises laminating another layer of transparent material onto the light absorbing layer 908. The further layer of transparent material may be the same as the layer of transparent material 902, e.g. another PMMA sheet with opposing rough surfaces. The two layers of transparent material are parallel to each other. The light absorbing layer 908 between the two layers of transparent material forms a padding of the rough surfaces of the two layers of transparent material.

The method further comprises depositing another layer of light absorbing layer onto the layer of transparent material similar to the depositing the layer of light absorbing material 908.

Figure 9C:
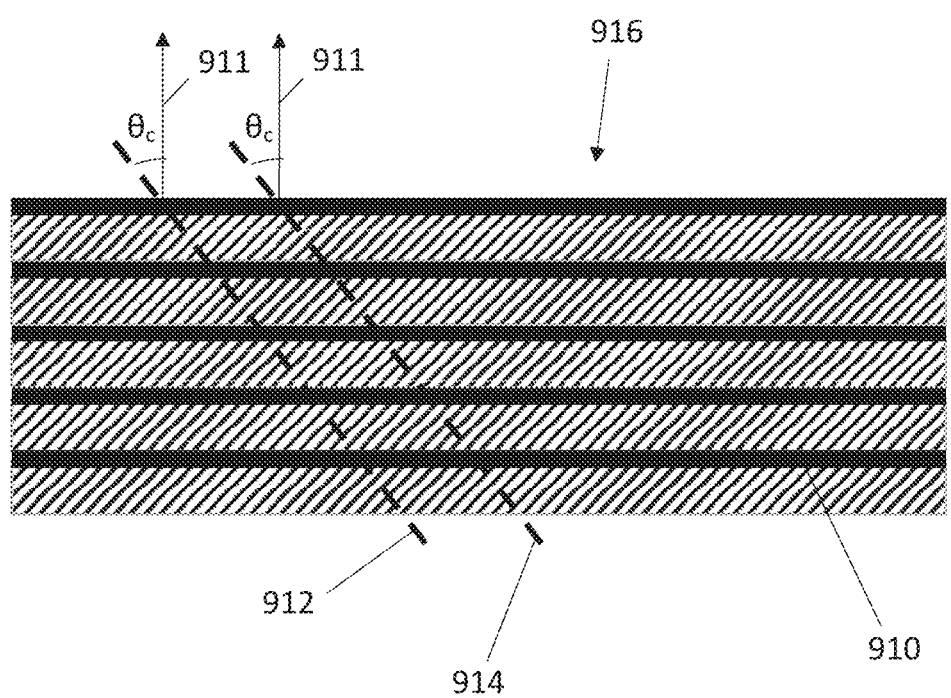
FIG. 9C is a cross-sectional view (not to scale) of a plurality of alternating layers of transparent material and light absorbing material.

The layering of the transparent material and the light absorbing material is repeated until a plurality of alternating layers of transparent material and light absorbing material 910 having a predetermined overall thickness is achieved. The layers of the plurality of alternating layers 910 is stacked in a stacking direction 911. The thickness is defined in the stacking direction 911, i.e. the direction in which the alternating layers 910 are stacked. A cross-sectional view (not to scale) of a plurality of alternating layers of transparent material and light absorbing material 910 is shown in FIG. 9C.

The method further comprises making a first cut 912 through the plurality of alternating layers of transparent material and light absorbing material 910, with a straight edge, at a first position and at a cutting angle $\theta_c$ to the stacking direction 911. The cutting angle $\theta_c$ may be less than or equal to 90°. The first cut 912 results in a top cut surface. The method further comprises making a second cut 914 through the plurality of alternating layers of transparent material and light absorbing material 910, with a straight edge, at a second position and at the cutting angle $\theta_c$ to the stacking direction 911. The second cut 914 results in a bottom cut surface. The first and second cuts 912, 914 are substantially parallel to each other. The first and second cuts 912, 914 are substantially planar.

Each of the first and second cuts 912, 914 may further comprise orientating a cutting implement comprising the straight edge such that the straight edge faces a top 916 of the plurality alternating layers 910. Once orientated in such a way, the cutting implement moves along a first or second cutting plane orientated at the cutting angle $\theta_c$ thereby cutting through the plurality of alternating layers 910.

Figure 9D:
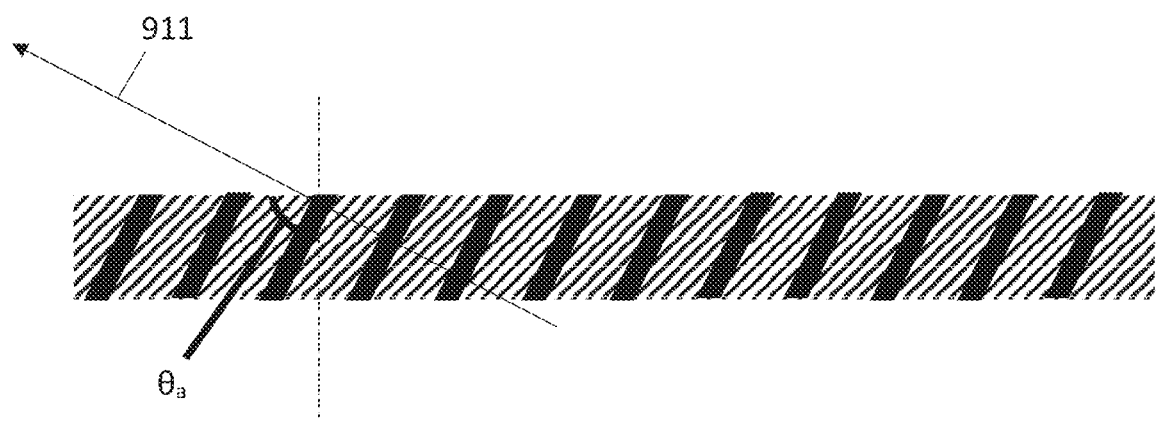
FIG. 9D is a cross-sectional view (not to scale) of an intermediate layer cut from the plurality of alternating layers.

The first and second cuts would result in an intermediate layer comprising strips of light absorbing materials positioned at periodic positions. The intermediate layer would also have the top and bottom cut surfaces. The top and bottom cut surfaces of the intermediate film may be polished. The angle between each of the strips of light absorbing materials and the top cut surface is $\theta_a$, $\theta_a=90°-\theta_c$. The intermediate film has a structure of a louver film. A cross-sectional view (not to scale) of an intermediate layer cut from the plurality of alternating layers 910 is shown in FIG. 9D. The angle $\theta_c$ is also the louvre angle (measured from the surface normal) when in use.

The method further comprises providing a tool 919 for hot-embossing 1D prismatic structure. The tool 919 may be a hot embossing stamp. The tool 919 comprises a substrate 920 and a repeating prismatic structure 922 extending from the substrate. The prismatic structure 922 that repeats comprises a front facet 924 and a back facet 926. The front and back facets 924, 926 at least partially define a prism. The tool 919 further comprises ridges defined by the portions where the front facets 924 meet the back facet 926. There is an angle $\theta_f$ between the front facet 924 and the top cutting surface. The back facet 926 is orientated in the same way as the strip of light absorbing material. In other words, the angle $\theta_b$ between the back facet and the substrate is the same as the angle $\theta_a$ between the strip of light absorbing material and the cut surface of the intermediate film.

Figure 9E:
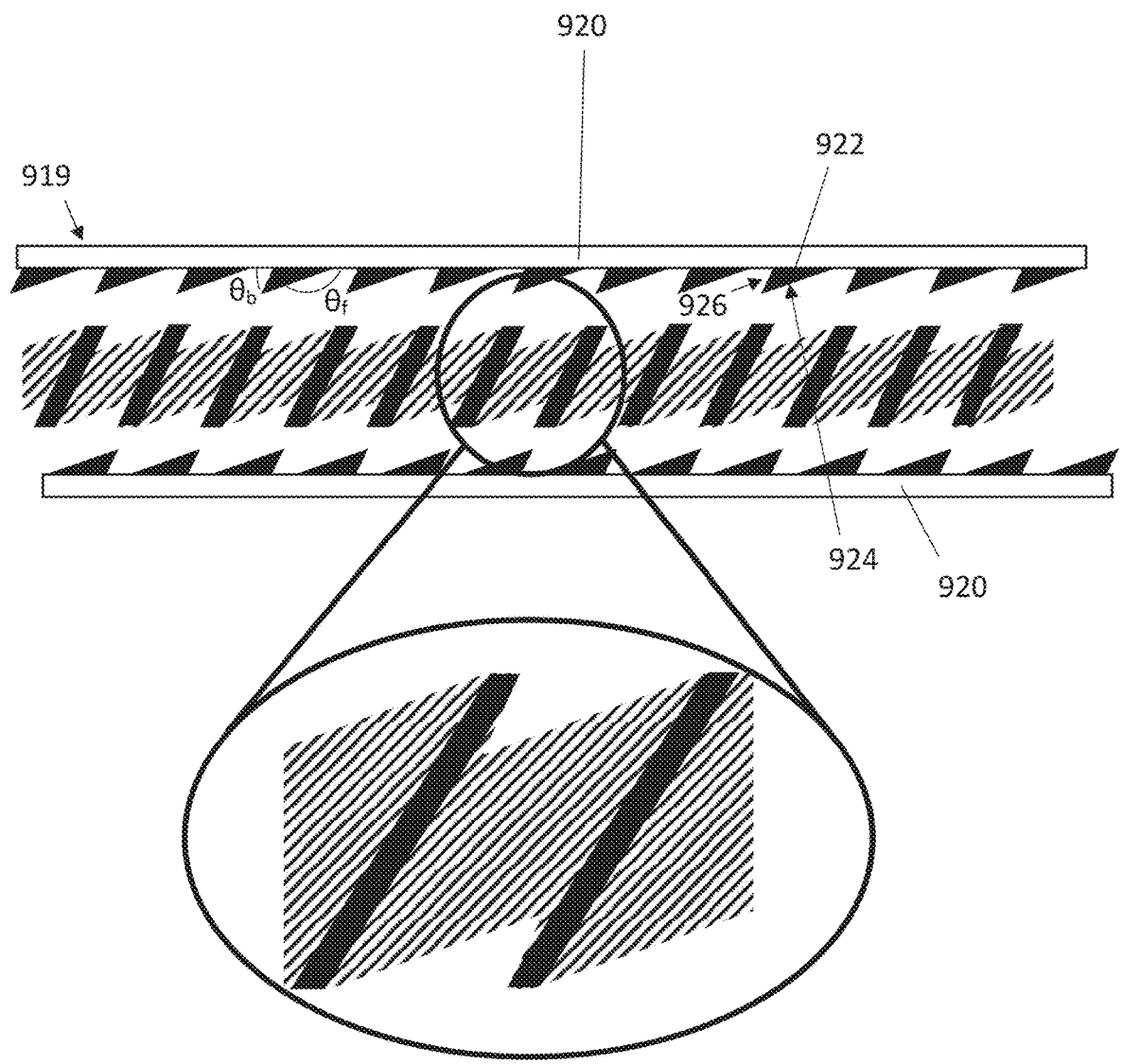
FIG. 9E is a cross-sectional view (not to scale) of a light control film manufactured from the intermediate layer.

FIG. 9E shows a cross-sectional view (not to scale) the intermediate layer undergoing hot embossing to form a light control film. The method further comprises aligning tool 919 with the top cut surface of the intermediate layer such that the ridges of the tool 919 overlays edges of the periodically positioned strips of light absorbing materials and the front facets 924 overlays the transparent materials.

The method further comprises hot-embossing, using the aligned tool 919, the top cut surface of the intermediate film to form a serrated first surface. Each serration is formed between respective pairs of adjacent light absorbing strips. Each serration of the serrated first surface is at an angle $180-\theta_f$. Therefore, the angle $\theta_f$ determines the angle of the serrations of the serrated first surface. In some embodiments, for effective sunlight reflection suppression, the angle $\theta_f$ is less than 150° such as less than 145°.

The method further comprises aligning tool 919 with the bottom cut surface of the intermediate layer such that the ridges of the tool 919 overlays edges of the periodic positioned strips of light absorbing materials and the front facets 924 overlays the transparent materials.

The method further comprises hot-embossing, using the aligned tool 919, the bottom cut surface of the intermediate film to form a serrated second surface thereby manufacturing a light control film. Each serration is formed between respective pairs of adjacent light absorbing strips. Each serration of the serrated second surface is at an angle $180-\theta_f$. Therefore, the angle $\theta_f$ determines the angle of the serrations of the serrated second surface. The serrations of the serrated first and second surfaces are parallel to each other.

The method may further comprise apply an anti-reflective coatings to the serrated first and/or second surfaces of the light control film.

The light control film manufactured in the above-described way can be positioned to cover the exit surface of a holographic HUD and is in direct contact with sunlight (transmitted through windshield). The holographic HUD may output emissions that require all rays in a bundle to maintain the relative angle, phase, and intensity through any optical surface. A matte surface is not an appropriate solution for glare mitigation in such holographic HUDs. The present inventors have found that a periodic, serrated, flat surface can address the direct reflection from the outer surface. In particular, the inventors found that serrated surfaces angled at >30° or even >35° (defined as an angle between the serrated surface and the horizontal axis) means that any reflected sunlight cannot reach the eye-box. Meanwhile, any reflection from inner surfaces (e.g. from glass or coatings) is absorbed by louvres (i.e. the strips of light absorbing material), which is aligned to HUD gut ray.

Example

The manufacturing process may comprise the following steps:
1. Prepare (e.g.) PMMA (about 1 mm thick) sheet with rough (scattering) surface on both sides. Any light through the surface will be scattered to different angles.
2. Apply thin (about 10-100 µm thick) black adhesive paint/adhesive on one side of the PMMA sheet—e.g. by airbrushing or solution coating techniques.
3. Laminate another PMMA sheet with rough surface onto the black adhesive surface. The two PMMA sheet maintain overall parallelism while the black adhesive material forms the padding of the rough surfaces.
4. Repeat 2 and 3 so that the total thickness of the stack approaches the required dimension for the display application.
5. Use a knife with straight edge to cut the stack at an angle. After cutting, polish the surface if necessary. The resulting film has periodic black adhesive strips aligned at an angle. The angle may be parallel to the gut ray of the display light in use.
6. Prepare tooling for hot-embossing 1D prismatic structure. The front facet of the prism determines the angle of the serrated surface, while the side facet of the prism is aligned to the louver angle in 5. The prismatic structure must have the same pitch as black adhesive strips in 5.
7. Use the tooling to hot-emboss both surfaces of the louver film in 5, making sure the prism corners accurately land at the edge of black adhesive strips so that a flat, serrated PMMA surface is formed between each pair of adjacent black adhesive strips. The serrated PMMA surfaces on both sides of the film are always parallel.
8. Optionally apply anti-reflective coatings to the serrated surface(s).

In a variant, if structure requires variation in louvre angle through the component, PMMA pieces used in steps 1 and 3 may be wedge-shaped such that there is angle difference between adjacent louvre barriers.

ADDITIONAL FEATURES

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of manufacturing a light control film, the method comprising:
   providing a plurality of alternating layers of transparent material and light absorbing material, wherein the alternating layers of transparent material and light absorbing material are stacked in a stacking direction;
   cutting, with a straight edge, through the plurality of alternating layers of transparent material and light absorbing material in a first cutting plane and a second cutting plane thereby resulting in an intermediate film comprising a first cut surface parallel to the first cutting plane and a second cut surface parallel to the second cutting plane, wherein each of the first and second cutting planes is orientated at an angle less than 90° to the stacking direction; and
   hot embossing, using a tool having a repeating prismatic structure, the repeating prismatic structure on the first cut surface of the intermediate film thereby resulting in a serrated first surface.

2. The method of claim 1, further comprising hot embossing, using the tool, the repeating prismatic structure on the second cut surface of the intermediate film thereby resulting in a serrated second surface.

3. The method of claim 1, further comprising aligning ridges of the prismatic structure with edges of the layers of light absorbing material before hot embossing the repeating prismatic structure.

4. The method of claim 3, wherein the repeating prismatic structure of the tool comprises:
   a substrate;
   a front facet extending from the substrate; and
   a back facet extending from the substrate;
   wherein the front and back facets at least partially define a prism, and
   wherein the ridges of the prismatic structure are defined by where the front facets meet the back facets.

5. The method of claim 4, wherein angles between the back facets and the substrate is substantially the same as angles between the layers of light absorbing material and the first and/or second cut surface.

6. The method of claim 1, wherein the first and second cutting planes are parallel with each other.

7. The method of claim 1, wherein the serrated first surface comprises a first front facet at an angle greater than 30°.

8. The method of claim 1, wherein the serrated second surface comprises a second front facet at an angle greater than 30°.

9. The method of claim 1, wherein the providing the plurality of alternating layers comprises:
   providing a first layer of transparent material;
   providing a first layer of light absorbing material onto the first layer of transparent material;
   providing a second layer of transparent material onto the first layer of light absorbing material such that the first layer of light absorbing material is between the first and second layers of transparent material; and
   providing a second layer of light absorbing material onto the second layer of transparent material such that the second layer of transparent material is between the first and second layers of light absorbing material.

10. The method of claim 1, wherein providing the plurality of alternating layers of transparent material and light absorbing material comprises airbrushing or solution coating at least one layer of light absorbing material on at least one layer of transparent material.

11. The method of claim 1, wherein each of the layers of transparent material comprises opposing rough surfaces configured to scatter light.

12. The method of claim 1, wherein the layers of light absorbing material comprise a black adhesive, a black paint, a black silicone rubber, or any combination thereof.

13. The method of claim 1, wherein the layers of transparent material comprise PMMA or transparent silicone rubber or any combination thereof.

14. The method of claim 1, wherein each layer of light absorbing material has a thickness of 10 µm to 100 µm.

15. The method of claim 1, wherein each layer of transparent material has a thickness of 0.1 mm to 10 mm.

16. The method of claim 1, further comprising applying an anti-reflective coating on the serrated first and/or second surface.

17. The method of claim 1, wherein each layer of the transparent material is wedge shaped.

18. The method of claim 1, wherein the layers of the plurality of alternating layers are parallel to each other.

19. A method of manufacturing a head-up display for a vehicle, the method comprising:
   providing an optical component having a reflective surface arranged, during head-up display operation, in a configuration that is conducive to sunlight glare; and
   disposing a light control film manufactured using the method of claim 1 on the reflective surface of the optical component.

20. A head-up display for a vehicle, wherein the head-up display comprises:
   an optical component having a reflective surface arranged, during head-up display operation, in a configuration that is conducive to sunlight glare; and
   a light control layer, manufactured using the method of claim 1, disposed on the reflective surface of the optical component.

* * * * *